W. L. FISH.
BOBBIN-WINDERS FOR SEWING-MACHINES.

No. 187,000                                  Patented Feb. 6, 1877.

Attest:
R. A. Seely
F. Benjamin

W. L. Fish
per Oliver Drake
his attorney

UNITED STATES PATENT OFFICE.

WARREN L. FISH, OF NEWARK, NEW JERSEY.

IMPROVEMENT IN BOBBIN-WINDERS FOR SEWING-MACHINES.

Specification forming part of Letters Patent No. 187,000, dated February 6, 1877; application filed October 26, 1876.

*To all whom it may concern:*

Be it known that I, WARREN L. FISH, of the city of Newark, in the county of Essex and State of New Jersey, have invented certain new and useful Improvements in Sewing-Machines; and I do hereby declare that the following is a full, clear, and exact description thereof, which will enable others skilled in the art to which it appertains to make and use the same, reference being had to the accompanying drawing, and to letters of reference marked thereon, which form a part of this specification.

The object of my invention is an attachment for sewing-machines, whereby the bobbins may be wound without operating the driving-shaft of the machine.

Figure 1:
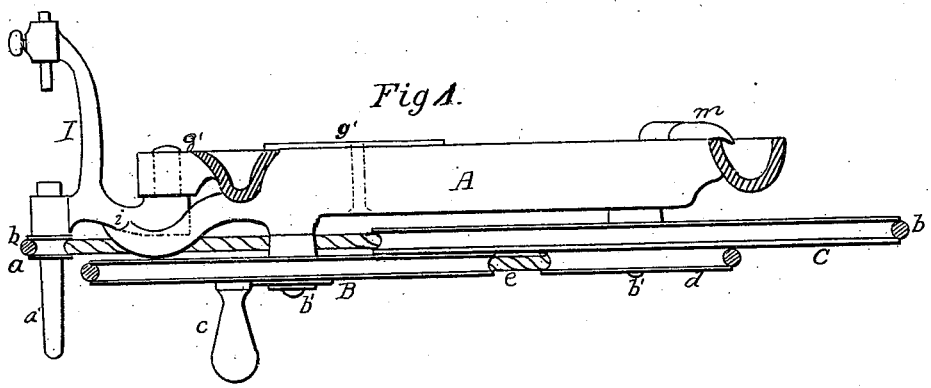
Figure 2:
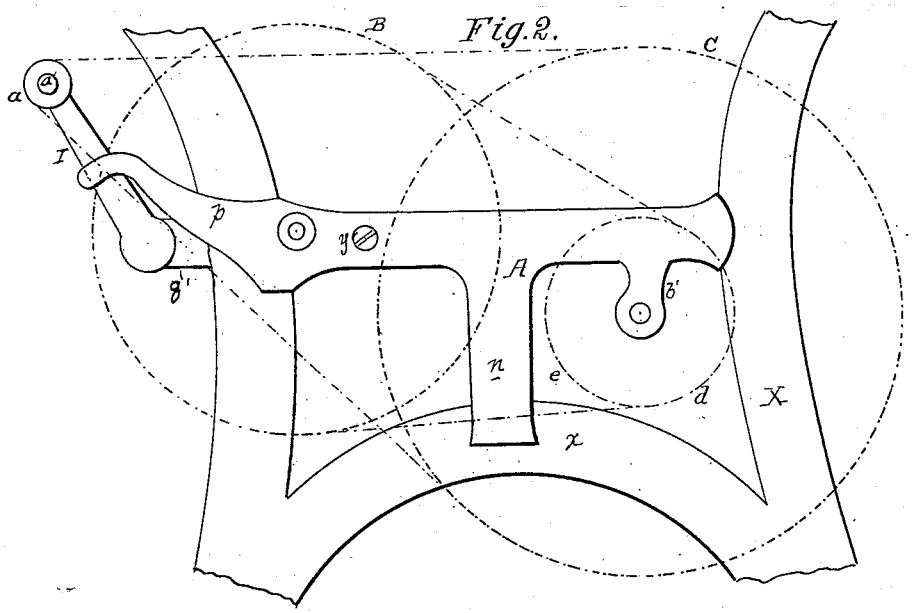
Figure 3:
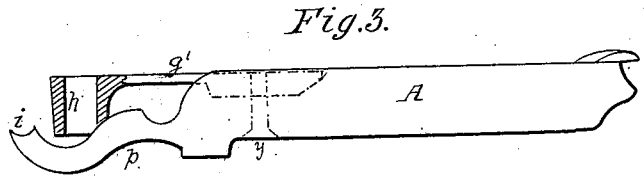

In the drawing, Figure 1 is a sectional plan; Fig. 2, a side view, showing the attachment applied to the leg of a sewing-machine; and Fig. 3 is a plan showing an attachment.

A is a metallic frame, provided with a lip, $m$, and a plate, $g$, secured by a screw-bolt, $y$, arranged as shown, so as to give bearings on both sides of the legs or frame X of the sewing machine to which the device is applied. Where the frame X has a cross-piece, $x$, an extension, $n$, of the frame A has a bearing thereon, as shown. To the frame are hung the driving-wheel B and grooved pulleys C $d$, and from one end of the frame extends an arm, $p$, having at its end a socket, $i$. The frame carries a swinging bracket, I, having bearings for the bobbin-winding shaft $a'$, carrying the pulley $a$. Heretofore this shaft has been driven from the driving-shaft of the sewing-machine, which is, as is well known, very objectionable. By passing a band, $b$, from the pulley $d$ to the pulley $a$ of the winding-shaft, the latter can be driven by revolving the driver B, the bracket I resting on the socket $i$ of the arm $g'$, whereby it is sustained in its proper position, thus overcoming the objection before alluded to. When the frame A is to be applied or removed the plate $g'$ is loosened by turning the screw $y$, and is then secured so as to clamp to or afford a bearing on the leg. For a machine provided with a bracket, I, the arm $p$ serves as a bracket-support.

I claim—

The within-described bobbin-winding attachment, consisting of the frame A, its socketed arm $p$, driving-wheels and pulleys B C $d$, combined with the bracket I, and with devices for securing the attachment to the leg of a sewing-machine, as specified.

In testimony that I claim the foregoing as my own I hereto affix my signature in presence of two witnesses.

WARREN L. FISH.

Witnesses:
OLIVER DRAKE,
A. D. WAGNER.